J. H. HACKLEY.
ASH PAN FOR LOCOMOTIVES.
APPLICATION FILED JULY 2, 1909.

953,137.

Patented Mar. 29, 1910.
2 SHEETS—SHEET 1.

Witnesses

Inventor
John H. Hackley.
By C. A. Snow & Co.
Attorneys

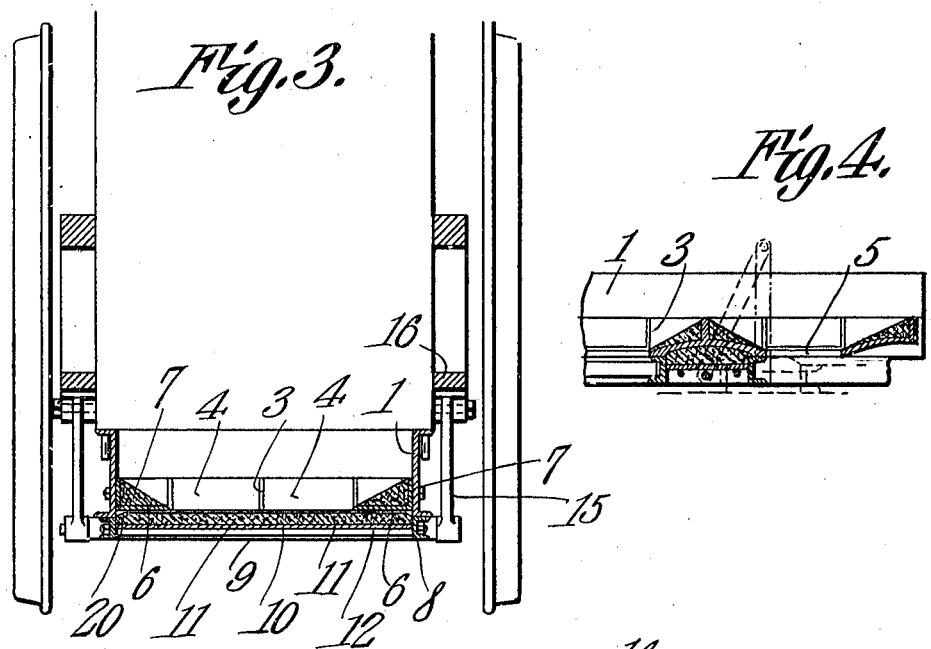

UNITED STATES PATENT OFFICE.

JOHN H. HACKLEY, OF CHERRYVALE, KANSAS.

ASH-PAN FOR LOCOMOTIVES.

953,137.      Specification of Letters Patent.      Patented Mar. 29, 1910.

Application filed July 2, 1909. Serial No. 505,724.

*To all whom it may concern:*

Be it known that I, JOHN H. HACKLEY, a citizen of the United States, residing at Cherryvale, in the county of Montgomery and State of Kansas, have invented a new and useful Ash-Pan for Locomotives, of which the following is a specification.

This invention relates to self-dumping ash-pans and its principal object is to provide a device of this character having a novel arrangement of insulating material whereby the communication of heat to the metal portion of the pan from the hot ashes contained within or supported above the pan, is prevented.

A further object is to provide a device of this character in which friction is reduced to the minimum, thus permitting the apparatus to be readily actuated.

A still further object is to provide an ash-pan the action of which is positive and none of the parts of which will bind under any conditions of temperature within the pan.

A still further object is to provide an ash-pan designed to swing and utilizing cross-bars, the upper or working faces of which are so shaped as to maintain a constant scraping or close contact with the adjoining fixed portion of the pan.

With these and other objects in view the invention consists in certain novel details of construction and combinations of parts hereinafter more fully described and pointed out in the claims.

In the accompanying drawings the preferred form of the invention has been shown.

Figure 1:
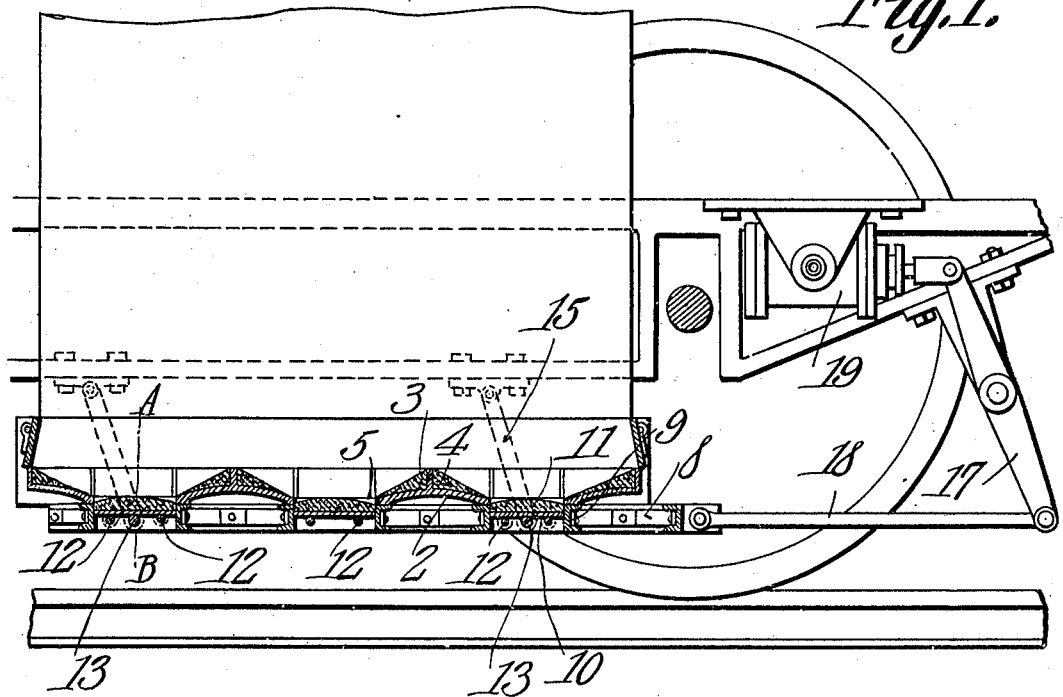
Figure 2:
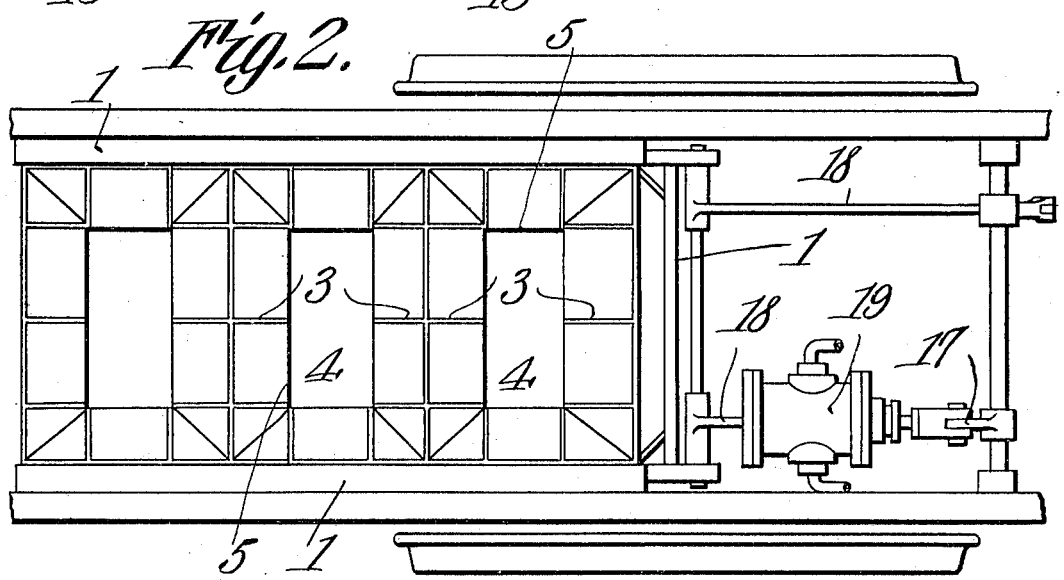

In said drawings:—Figure 1 is a longitudinal section through an ash-pan embodying the present improvements, the same being shown closed and the operating mechanism being disclosed in elevation. Fig. 2 is a plan view of the apparatus shown in Fig. 1. Fig. 3 is a section on line A—B Fig. 1. Fig. 4 is a longitudinal section through a portion of the pan and showing the relative positions of one of the fixed and one of the movable bars when the pan is open, an intermediate position of the movable bar being indicated by dotted lines. Fig. 5 is a plan view of the movable bottom of the pan.

Referring to the figures by characters of reference 1 designates the side and end walls of the pan, the same being preferably formed of channel irons suitably secured together, and, interposed between these channel irons and connecting the sides of the frame formed thereby, are arched castings 2, provided with upstanding longitudinal and transverse webs 3. An insulating material 4, made up of asbestos cement, fire-brick, or any other suitable substance, is arranged upon each of the arched castings 2 and between the webs 3, the upper faces of the insulation being inclined downwardly toward the longitudinal edges of the castings 2, it being understood of course that these castings are spaced apart so as to form outlet openings 5 there-between. These openings do not extend throughout the width of the pan, but terminate at end plates 6, which can either be formed with or secured to the end portions of the castings 2, and which support inclined insulating portions 7 as shown particularly in Fig. 3.

The parts heretofore referred to constitute the fixed portion of the ash-pan. The movable part of the pan is preferably made up of a frame 8 formed of channel irons, and having transversely extending channel irons 9 arranged therein in pairs, the irons of each pair being connected by a cross-plate 10, provided with a cover 11 of insulating material. Rods 12 extend under each of the plates 10 and connect the sides of frame 8, these rods serving to support the plate 10. Another rod 13 extends transversely through each end portion of the frame 8, preferably beneath one of the end plates 10, and the ends of these rods project beyond the sides of the frame 8 and constitute trunnions 14, which are engaged by the lower ends of parallel hangers 15, pivotally supported from the frame 16 of the locomotive.

The plates 10 are spaced apart distances equal to the distances between the openings 5 and it will be apparent therefore that all of these plates are designed to simultaneously assume positions below the respective openings to close them. The upper faces of the insulations 11 are rounded or convexed, the curvature of said faces being such as to maintain a constant close fit or contact between said faces and the edges of the castings 2 during the movement of the frame 8 in either direction. When the pan is open the insulations 11 assume positions within the concavities formed by the lower faces of the castings 2, and as indicated in Fig. 4.

Any suitable mechanism may be utilized for actuating the movable portion of the pan, the same being preferably shifted by means of a lever 17, one end of which is attached to the frame 8 by means of a pitman 18, while the other end of said lever is connected to a piston mounted to reciprocate within a cylinder 19. This cylinder is designed to receive compressed air or steam for the purpose of actuating the piston and lever and thus shifting the frame 8.

When the parts are in their normal positions the plates 10 are located below the openings 5 and with the insulations 11 exposed within said openings. It will be apparent that hot ashes deposited within the pan will rest upon the insulating material indicated at 4 and 11 and the metal parts of the pan will thus be prevented from warping and burning out as a result either of the heat contained within the contents of the pan or that radiated from the fire above the pan.

When it is desired to dump the contents of the pan the frame 8 is shifted so as to cause the hangers 15 to swing and bring the plates 10 below the castings 2 and with the insulations 11 seated within the concavities formed by the lower faces of the castings. During this swinging movement of the frame 8 the upper convex faces of the insulations 11 will remain constantly in contact with those edges of the castings 2 under which they are traveling. Said edges will thus act as scrapers to keep the upper faces of the insulations 11 clean, and thus render them free to easily return to their closed positions during the reverse movement of the frame 8.

By providing the inclined insulations 4 the same form hopper-like portions for directing ashes downward to the openings 5, thus insuring the discharge of all the contents of the pan.

The recesses formed by the concave lower faces of the stationary members constitute seats for the movable members and enable them to be compactly stored while the bottom of the ash-pan is open. Moreover by reason of the peculiar arrangement of the oscillating hangers it is necessary to provide these recesses in order to allow for the upward movement of the movable members during the completion of the operation of opening the ash pan.

It is of course to be understood that various changes may be made in the construction and arrangement of the parts without departing from the spirit or sacrificing the advantages of the invention. For example, in lieu of providing solid insulating material such as asbestos cement, fire-brick and the like, hollow metal castings may be utilized, the same being filled with any preferred form of insulating material or being cooled in any desired manner.

As shown particularly in Fig. 3 the ends of each of the insulations 11 are preferably beveled so as to prevent the same from binding upon the side irons 1 should the parts be shifted while the engine is tilted to one side, as when rounding a curve. These beveled ends have been indicated at 20. It will be noted too that diagonal braces 21 may be interposed between the end portions of the pairs of irons 9, these braces being attached to the sides of the frame 8 and serving to hold the irons 9 in fixed relation at all times to the sides of the frame 8.

What is claimed is:—

1. A device of the class described including a fixed frame, spaced members disposed therein and having concave lower faces forming longitudinal recesses, upstanding webs integral with the spaced members, heat-resisting material upon the frame and members and interposed between and held by the webs, said material being inclined downwardly toward the openings between said members, a frame mounted for oscillation below the fixed frame, spaced members carried thereby, and a covering of heat-resisting material upon each of said members and having a convexed upper face in constant contact with one of the longitudinal edges of an adjoining fixed member, said movable members constituting closures for the openings between the fixed members, and being shiftable into the recesses beneath the fixed members.

2. A device of the class described including a fixed frame, spaced members therein, each of said members being transversely arched, a frame mounted for oscillation below said members, spaced members carried by the frame and constituting closures for the spaces between the fixed members, each of said movable members having a transversely convexed upper face arranged to constantly contact with one of the fixed members during the movement of the movable members, the movable members being so hung that when they are swung into an open position the convex surfaces thereof interlock with the concave under surfaces of the stationary members.

3. In a device of the class described a frame mounted for oscillation, spaced members carried thereby, a covering of heat-resisting material upon each member, said covering having a transversely convexed face, transversely arched spaced members disposed above the frame and fixed with relation thereto, the bottom concavities of said fixed members constituting seats for the movable members when in one position, said movable members having a sliding contact with the fixed members and being shiftable therebetween to constitute closures for the spaces between the fixed members.

In testimony that I claim the foregoing as my own, I have hereto affixed my signature in the presence of two witnesses.

JOHN H. HACKLEY.

Witnesses:
RUSSELL HOWARD,
REVILO NEURTON.